United States Patent [19]

Christ et al.

[11] 4,325,584
[45] Apr. 20, 1982

[54] MOUNTING FOR A ROTOR

[75] Inventors: Alfred Christ, Zurich, Switzerland; Mario Peron, Schio, Italy

[73] Assignee: Escher Wyss Limited, Zurich, Switzerland

[21] Appl. No.: 201,432

[22] Filed: Oct. 28, 1980

[30] Foreign Application Priority Data

Nov. 2, 1979 [CH] Switzerland .................. 9851/79

[51] Int. Cl.³ ............................................. F16C 32/06
[52] U.S. Cl. ......................................... 308/9; 308/170
[58] Field of Search ............... 308/9, DIG. 1, 170, 308/140, 160, 163, 172

[56] References Cited

U.S. PATENT DOCUMENTS 3,353,877 11/1967 Lindeboom ..................... 308/170
3,973,810 8/1976 Montag ................................ 308/9
4,073,549 2/1978 Christ et al. ........................ 308/9
4,113,325 9/1978 Miller ................................... 308/9

Primary Examiner—Lenard A. Footland
Attorney, Agent, or Firm—Robert A. Ostmann

[57] ABSTRACT

Mounted on the rotor 1 is a plate 10 which is connected to the rotor at a point 11 so as to be immovable in the direction of support but tiltable relative to the rotor 1. On one side, the plate 10 carries the sliding surface 4 for the mounting member 5 comprising the support surface 6 and, on its other side, the plate 10 forms the cross sectional surface 12 of a pressure cushion 13. The support surface 6 and the cross sectional surface 12 are located opposite each other and are substantially the same size. The pressure in the pressure cushion 13 and the pressure in the space between the sliding surface 4 and the support surface 6 are kept substantially the same as each other. As a result, the plate 10 and hence the sliding surface 4 remain flat even when deformation of the rotor occurs.

5 Claims, 3 Drawing Figures

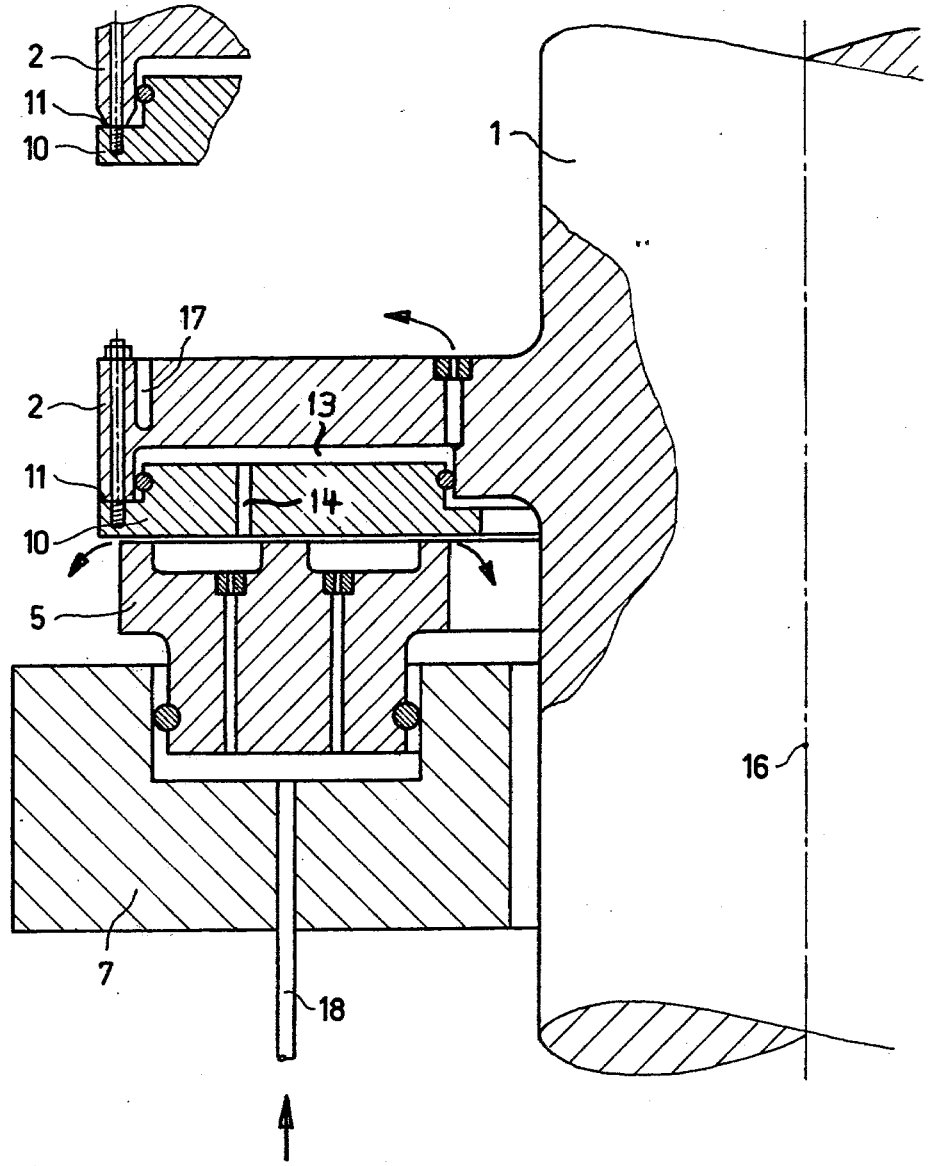

MOUNTING FOR A ROTOR

BACKGROUND OF THE INVENTION

The invention relates to a mounting for a rotor relative to a base by means of a sliding surface associated with the rotor and rotating therewith and by means of a mounting member mounted realtive to the base and comprising a support surface cooperating with the sliding surface.

For mounting rotors, it is advantageous to use hydrostatic support members, which cause only slight frictional losses. In these support members, only a very thin lubricating film is formed between the slinding surface of the rotor and the support surface of the mounting member, at the edges of the support surface surrounding the hydrostatic bearing pockets. In larger rotors, i.e. those with a larger sliding surface, it is difficult to guarantee the presence of the narrow gap required for the lubricating film.

SUMMARY OF THE INVENTION

The aim of the invention is to permit satisfactory hydrostatic mounting even in large rotors.

According to the invention, this aim is achieved, in a mounting of the kind described at the beginning, in that there is mounted on the rotor a plate which is attached to the rotor at one point so as to be immovable in the direction of support but tiltable relative to the rotor, said plate having, on its one side, the sliding surface of the rotor and forming, on its other side, the cross sectional surface of a pressure cushion, the cross sectional surface and the support of the mounting member surface being located opposite each other, and the effective portion of the support surface and the cross sectional surface being substantially the same size, and the pressure in the pressure cushion and the pressure in the space located between the sliding surface and the effective portion of the support surface being kept substantially the same as each other.

The invention is based on the finding that larger rotors buckle under the effets of the operating forces and, more particularly, the supporting forces, with the result that the sliding surface used for mounting the rotor is no longer flat. The gap between the flat support surface of the mounting member and the non-flat sliding surface of the rotor is therefore not the same size at all points. If considerable buckling occurs, direct contact is made between the sliding surface and the supporting surface, resulting in corresponding wear on these surfaces.

However, the measures adopted according to the invention ensure that the sliding surface of the rotor remains flat even if the rotor is deformed.

Advantageously, the plate comprising the sliding surface is provided with a channel which connects the space between the sliding surface and the support surface to the pressure cushion.

To enable the mounting member to adapt itself as accurately as possible to the flat sliding surface, it is advantageous for the mounting member to define, with the base, a pressure chamber and to be inclinable relative to the base.

For axial mounting, the plate is advantageously constructed as a circular disc, In larger rotors, a ring-type mounting is advantageously provided, and the plate is constructed as an annular disc.

BRIEF DESCRIPTION OF THE DRAWING

Embodiments of the object of the invention are shown schematically in the drawing and described in more detail with reference to the drawing, wherein:

FIG. 2 shows an axial section through a ring-type axial mounting, and

FIG. 3 shows a detail from FIG. 2.

DESCRIPTION OF THE PREFERRED EMBODIMENTS

Figure 1:
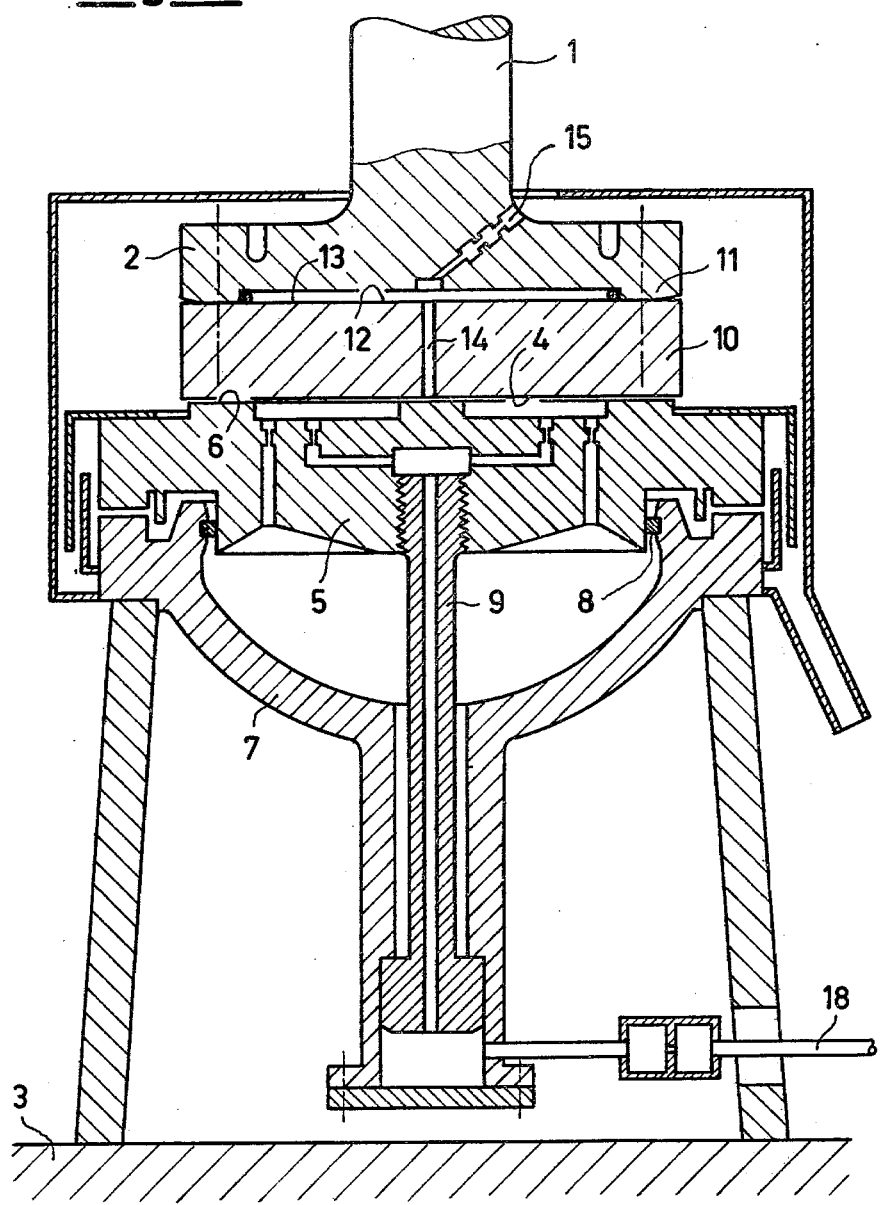
FIG. 1 shows an axial section through a central axial mounting.

In the mounting shown in FIG. 1, a rotor 1 with a flange 2 is mounted relative to a base 3. Associated with the rotor is a sliding surface 4 which rotates therewith. A mounting member 5 is mounted relative to the base 3 and comprises a support surface 6 cooperating with the sliding surface 4.

The mounting member 5 engages in a pressure cylinder 7 fixedly connected to the base 3, and rests on a liquid contained in the pressure cylinder 7. A connection 8 connecting the mounting member 5 to the pressure cylinder 7 is constructed so that the mounting member 9 can be inclined relative to the axis of the rotor 1. A flexible rod 9 holds the mounting member 5 in position in the axial direction of the rotor 1.

Mounted on the rotor 1 is a plate 10 which is connected to a point 11 on the rotor, i.e. to the periphery of the flange 2, so as to be immovable in the direction of support of the mounting but tiltable relative to the rotor 1 and, on its other side, it forms the cross sectional surface 12 of a pressure cushion 13. The support surface 6 of the mounting member 5 and the cross sectional surface 12 are located opposite each other. The effective portion of the support surface 6 is substantially the same size as the cross sectional surface 12. A channel 14 connects the space located between the sliding surface and the effective portion of the support surface 6 to the pressure cushion 13, so that the pressure is substantially the same on both sides of the plate 10. The plate 10 thus remains flat.

Whereas, in the central mounting shown in FIG. 1, the plate 10 is in the form of a circular disc, it is constructed as an annular disc in the ring-type mounting shown in FIG. 2. The mounting member 5 is correspondingly annular as well and comprises bearing pockets distributed in a ring-type configuration. The pressure cylinder 7 is also annular. The axis of the rotor is designated by reference numeral 16.

The plate 10 is connected to the rotor 1 at the point 11 on the flange 2, i.e. on the outer periphery of the flange 2, so as to be immovable in the direction of support but tiltable relative to the rotor 1. The flange 2 comprises an annular groove 17 extending over the entire circumference. In the embodiment shown in FIG. 3, the flange 2 abuts on the plate 10 at the point 11 in a knife-edge configuration.

In all the drawings, like parts have been given the same reference numerals.

The presure fluid is supplied to the mounting through a duct 18 and passes, directly or indirectly, into the pressure chamber of the pressure cylinder 7 and, via throttle channels, into the bearing pockets of the support surface 6.

As is well known, the effective portion of the support surface is obtained by removing, from all the circumferential edges of the entire support surface, that half of the edge which is at the flow off side of the lubricating film.

In the embodiments shown in FIG. 1, the position of the mounting member 5 in the axial direction of the rotor 1 is fixed by means of the rod 9. In the embodiment according to FIG. 2, no corresponding device is shown. The rotor 1 may be fixed in the axial direction at any desired point. However, in the mounting according to FIG. 2, a hydraulic annular chamber extending in a ring around the mounting member 5 may also be provided, this hydraulic annular chamber being bounded by the mounting member 5 and the wall of the pressure cylinder 7 so as to form a servo motor. This servo motor, containing a constant amount of pressure medium, then restricts the possibility of movement of the mounting member 5 in the upward direction (in the drawing), without impeding the inclination of the annular member 5 relative to the plate 10, i.e. the formation of a uniform bearing gap.

We claim:

1. Mounting for a rotor relative to a base; said rotor having a sliding surface; a mounting member mounted relative to the base; said mounting member comprising a support surface cooperating with said sliding surface; the improvement that the rotor comprises a plate which is connected to the rotor at a point so as to be immovable in the direction of support but tiltable relative to the rotor; said plate having, on its one side, the sliding surface of the rotor; a pressure cushion the cross sectional surface of which is formed on the other side of said plate; the cross sectional surface of the pressure cushion and the support surface of the mounting member being located opposite each other; the effective portion of said support surface and the cross sectional surface of said pressure cushion being substantially the same size; and the pressure in the pressure cushion and the pressure in the space located between said sliding surface and said effective portion of the support surface being kept substantially the same as each other.

2. Mounting according to claim 1, wherein the plate has a channel which connects the space between the sliding surface and the effective portion of the support surface to the pressure cushion.

3. Mounting according to claim 1, wherein a pressure chamber is defined by said mounting member; and a pressure cylinder for said pressure chamber being connected to the base; said mounting member being inclinable relative to the base.

4. Mounting according to claim 1, wherein the plate is constructed as a circular disc.

5. Mounting according to claim 1, wherein the plate is constructed as an annular disc.

* * * * *